(12) United States Patent
Evangelisti

(10) Patent No.: US 6,623,273 B2
(45) Date of Patent: Sep. 23, 2003

(54) PORTABLE SPEECH THERAPY DEVICE

(76) Inventor: Fred C. Evangelisti, 63-49th St., Sacramento, CA (US) 95819

( * ) Notice: Subject to any disclaimer, the term of this patent is extended or adjusted under 35 U.S.C. 154(b) by 240 days.

(21) Appl. No.: 09/932,108

(22) Filed: Aug. 16, 2001

(65) Prior Publication Data

US 2003/0036041 A1 Feb. 20, 2003

(51) Int. Cl.⁷ .................................................. G09B 5/04
(52) U.S. Cl. ........................ 434/185; 434/169; 434/156; 600/558
(58) Field of Search ................................. 434/113, 156, 434/167, 169, 178, 185, 236, 258, 307 R, 308, 317, 322, 323, 336, 362, 365; 600/545, 558; 340/539.1, 815.4, 945; 273/429, 430; 345/901

(56) References Cited

U.S. PATENT DOCUMENTS

| | | | | |
|---|---|---|---|---|
| 3,667,138 A | * | 6/1972 | Cohen ........................... | 434/185 |
| 5,294,229 A | * | 3/1994 | Hartzell et al. ............... | 434/336 |
| 5,735,693 A | * | 4/1998 | Groiss .......................... | 434/157 |
| 5,975,910 A | * | 11/1999 | Sims-Barnes ................ | 434/178 |
| 5,991,594 A | * | 11/1999 | Froeber et al. ............... | 434/317 |
| 2002/0097168 A1 | * | 7/2002 | Mitchell et al. .............. | 340/945 |
| 2003/0040680 A1 | * | 2/2003 | Hassert et al. ............... | 600/558 |

* cited by examiner

*Primary Examiner*—Joe H. Cheng
(74) *Attorney, Agent, or Firm*—Bever, Hoffman & Harms, LLP; Patrick T. Bever

(57) ABSTRACT

A portable speech therapy device that enables post-operative cancer patients to practice voice exercises without direct supervision by activating a series of colored indicator lights in predetermined patterns associated with push-button actuation switches. The patient is initially taught to make a certain sound when an associated indicator light is turned on, and then allowed to practice with the device at home. The sequences associated with each actuation switch are made progressively more challenging as the patient masters the sequences associated with each switch (e.g., progressively shorter time periods allowed response, progressively greater number of prompts, or different patterns in which the colored indicators are turned on). The device is field programmable to allow the doctor to tailor sequences to correspond with a patient's recovery progress.

19 Claims, 4 Drawing Sheets

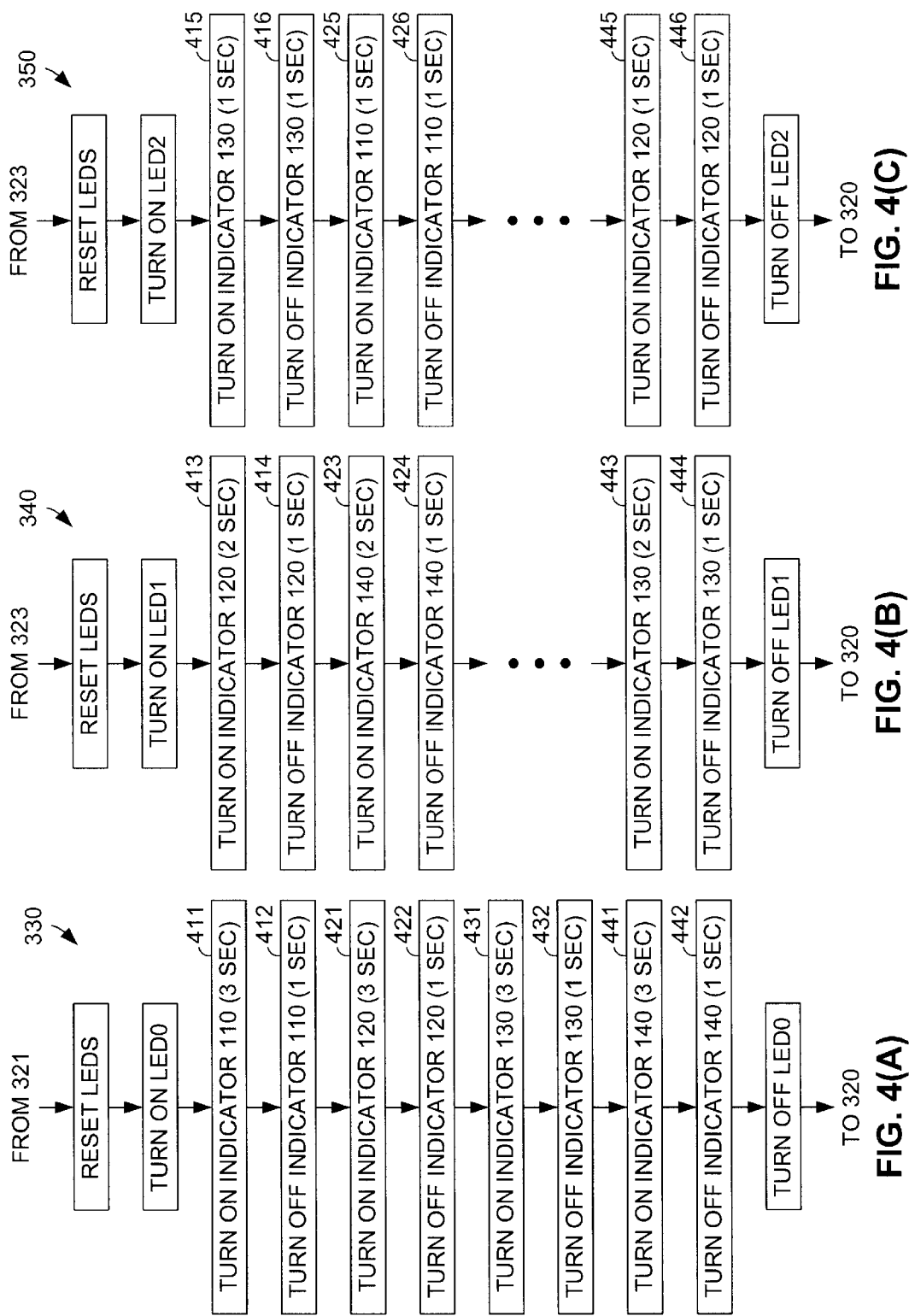

PORTABLE SPEECH THERAPY DEVICE

FIELD OF THE INVENTION

The present invention is directed to speech therapy methods, and in particular to speech therapy methods for post-operative vocal organ cancer patients.

BACKGROUND OF THE INVENTION

Experts in the profession of speech pathology work with patients whose speech or language skills are defective in one way or another. These specialists, called speech-language pathologists ("SLPs"), evaluate and correct defective speech and language and teach new speech and language skills. The field of speech therapy is often called speech pathology and SLPs are sometimes known as speech therapists, speech clinicians, or speech technicians.

Speech and language difficulties arise from a variety of physical problems, including cancer of the tongue or other vocal organs. Treatment in such instances typically involves surgery to remove cancerous growth from the affected vocal organs and post-operative chemotherapy treatment. Speech therapy is started as soon as possible after the operation to rehabilitate the affected vocal organs, and often takes place while a patient is undergoing chemotherapy. The method of speech therapy varies, but usually involves one-on-one sessions in which an SLP visually prompts a patient to make (utter) selected sounds that exercise the affected vocal organs. In many instances, the SPL develops practice drills during which the patient makes a series of such sounds in a predetermined or random pattern.

Post-operative cancer patients have several physical limitations that limit the patient's ability to participate in the speech therapy sessions. Chemotherapy typically impairs a patient's vision, limits manual dexterity, and generally renders a patient weak and immobile. Accordingly, the physically present of an SPL is typically required during speech therapy sessions to provide the visual prompts. Unfortunately, when an SPL is administering speech therapy to a first patient, a second patient may have to wait inactively for the SPL, and vice versa, thereby possibly increasing both patients' recovery time.

What is needed is a speech therapy device that provides visual prompts for eliciting a predetermined or random series of aural responses from a post-operative cancer patient, and takes into account the physical limitations of the patient.

SUMMARY OF THE INVENTION

The present invention provides a portable speech therapy device that enables post-operative cancer patients to practice voice exercises without the direct supervision of an SLP by activating a series of colored indicator lights in a predetermined pattern or random pattern. During an initial therapy session, the patient is taught by an SPL that each indicator light corresponds to a certain sound (e.g., A, I, U, ER), and the patient is taught to make the corresponding sound when the associated indicator light is turned on. The device is then used by the patient outside of the SPL's presence to practice making the sounds according to predetermined or random sequences that are initiated by actuation switches provided on the device. Accordingly, the portable speech therapy device can reduce recovery time by allowing patients making the sounds outside of the presence of an SPL (e.g., at home).

In accordance with the disclosed embodiment, the portable speech therapy device is mounted in a lightweight plastic housing, and includes four light-emitting indicators arranged along the top edge of the housing and several pushbutton actuation switches arranged along a side edge of the housing. Inside the housing is mounted a controller that detects actuation of a selected switch, and generates control signals that turn on and off the indicators in a pattern associated with the selected switch. Status indicators (e.g., LEDs) are provided next to each actuation switch that are turned on when an associated switch is selected by the patient/user.

In accordance with an aspect of the present invention, the sequences associated with each actuation switch are made progressively more challenging. In one disclosed embodiment, this additional challenge takes the form of progressively shorter time periods allowed for the patient's response. In another embodiment, each successive sequence includes a greater number of prompts. Another form of challenge is to change the sequence of indicator lights. These various challenges allow the patient to exercise, practice, and reinforce training learned in therapy at home without the direct supervision of an SLP, thereby potentially drastically reducing recovery time, and enabling the patient to resume improved speech much quicker than by conventional, SLP-supervised methods.

BRIEF DESCRIPTION OF THE DRAWINGS

These and other features, aspects and advantages of the present invention will become better understood with regard to the following description, appended claims, and accompanying drawings, where:

FIGS. 4(A), 4(B), and 4(C) are simplified flow diagrams showing indicator light sequences produced by the portable speech therapy device.

DETAILED DESCRIPTION OF THE DRAWINGS

Figure 1:
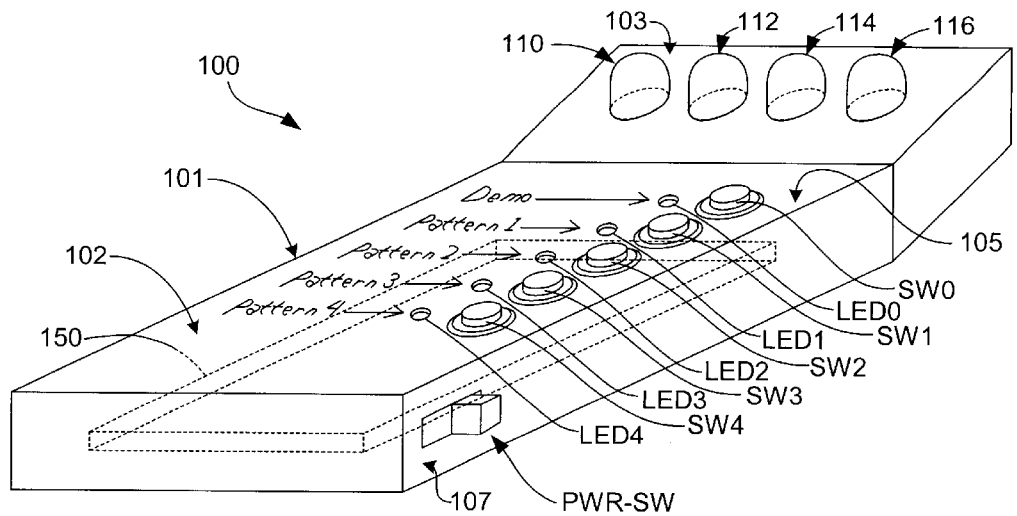
FIG. 1 is A perspective view showing a portable speech therapy device according to an embodiment of the present invention.

FIG. 1 is a perspective view showing a portable speech therapy device 100 according to an embodiment of the present invention that is fabricated for use by patients recovering from vocal organ (e.g., tongue) cancer. In particular, device 100 is utilized to prompt the patient to form four sounds (I, A, U, and ER) that take the tongue through its full range of motion. For example, movement of the tongue from a position required to make the vowel A (as in "cake") to a placement appropriate for making the vowel U (as in "hoot") requires elevation of the back portion of the tongue from the bottom of the mouth to within 1–2 mm of the soft palate. Similar tongue position changes are required to transition from U to A, from A to I, from A to ER, etc. By prompting a patient to make each of these four sounds in a random or predetermined sequence, device 100 prompts the patient to exercise his/her tongue over the full range of its motion. Accordingly, speech therapy device 100 can reduce recovery time by allowing patients to practice predetermined or random patterns of the four sounds outside of the presence of an SPL (e.g., at home).

To facilitate use by post-operative vocal organ cancer patients outside of the presence of an SPL, speech therapy device 100 is constructed to maximize safety and portability. For example, device 100 is formed from lightweight materials (e.g., having a total weight of approximately 8.4 ounces), and is assembled in a plastic housing 101 having a size (e.g., approximately 6.5 inches long, 3.25 inches wide, and 1–1.5 inches thick) that can be handled and manipulated by patients having limited strength and dexterity, and that would minimize physical injury if dropped by the patients. In addition, device 100 has its own power source and power transformer (e.g., a standard 9 Volt battery and a 5 Volt regulator circuit) contained within housing 101 to maximize transportability and to avoid the safety considerations and requirements of 120 VAC power.

As shown in FIG. 1, device 100 includes a row of light-emitting indicators 110–140 and a row of actuation switches SW0–SW4 formed on an upper wall 102 of housing 101, and a controller 150 mounted inside of housing 101. As described in additional detail below, controller 150 stores sets of instructions (data) associated with each actuation switch SW0–SW4, and generates control signals used to turn on and off light-emitting indicators 110–140 in a sequence defined by a selected set of instructions when the associated actuation switch SW0–SW4 is manually depressed by a patient/user.

Light-emitting indicators 110–140 are mounted on upper wall 102 of housing 101 along a top edge 103, and each indicator generates a unique colored light (i.e., different from the other indicators). For example, indicator 110 generates a red light, indicator 120 generates a white light, indicator 130 generates a yellow light, and indicator 140 generates a green light. Indicators 110–140 are preferably extremely bright (e.g., 7,000–23,000 millicandles (mcd) or greater) so that patients undergoing chemotherapy and confined to hospital beds (i.e., visually impaired) can easily see the indicators turn on in ambient room light. In one embodiment designed to maximize battery life, indicators 110–140 comprise 10 millimeter light-emitting diodes (LEDs), with the red and white LEDs each producing 7,000 mcd, the green LED producing 15,000 mcd, and the yellow LED producing 23,000 mcd. In an alternative embodiment, colored light bulb containing white light sources (e.g., filaments or white LEDs) may be utilized in place of colored LEDs.

Push-button switches SW0–SW4 are arranged along a side edge 105 of housing 101, and are utilized to initiate a selected sequence. In the disclosed embodiment, each switch is identified by corresponding indicia. For example, a first switch SW0 utilized to initiate a demonstration sequence is identified by corresponding indicia "Demo". Similarly, switches SW1–SW4 are respectively identified by the indicia "Pattern 1", "Pattern 2", "Pattern 3" and "Pattern 4", each corresponding to a unique sequence. Located next to each switch SW0–SW4 is a status indicator LED0–LED4, respectively, that is lit to identify a currently executed sequence. For example, when a patient selects the "Demo" pattern, switch SW0 is manually depressed (actuated), thereby causing controller 150 to turn on status indicator LED0, and to execute the sequence associated with the "Demo" pattern. In one embodiment, status indicators LED0–LED4 are red LEDs. In addition to push-button switches SW0–SW4, a slide-type power switch PWR-SW is provided on a side wall 107 of housing 101.

Figure 2:
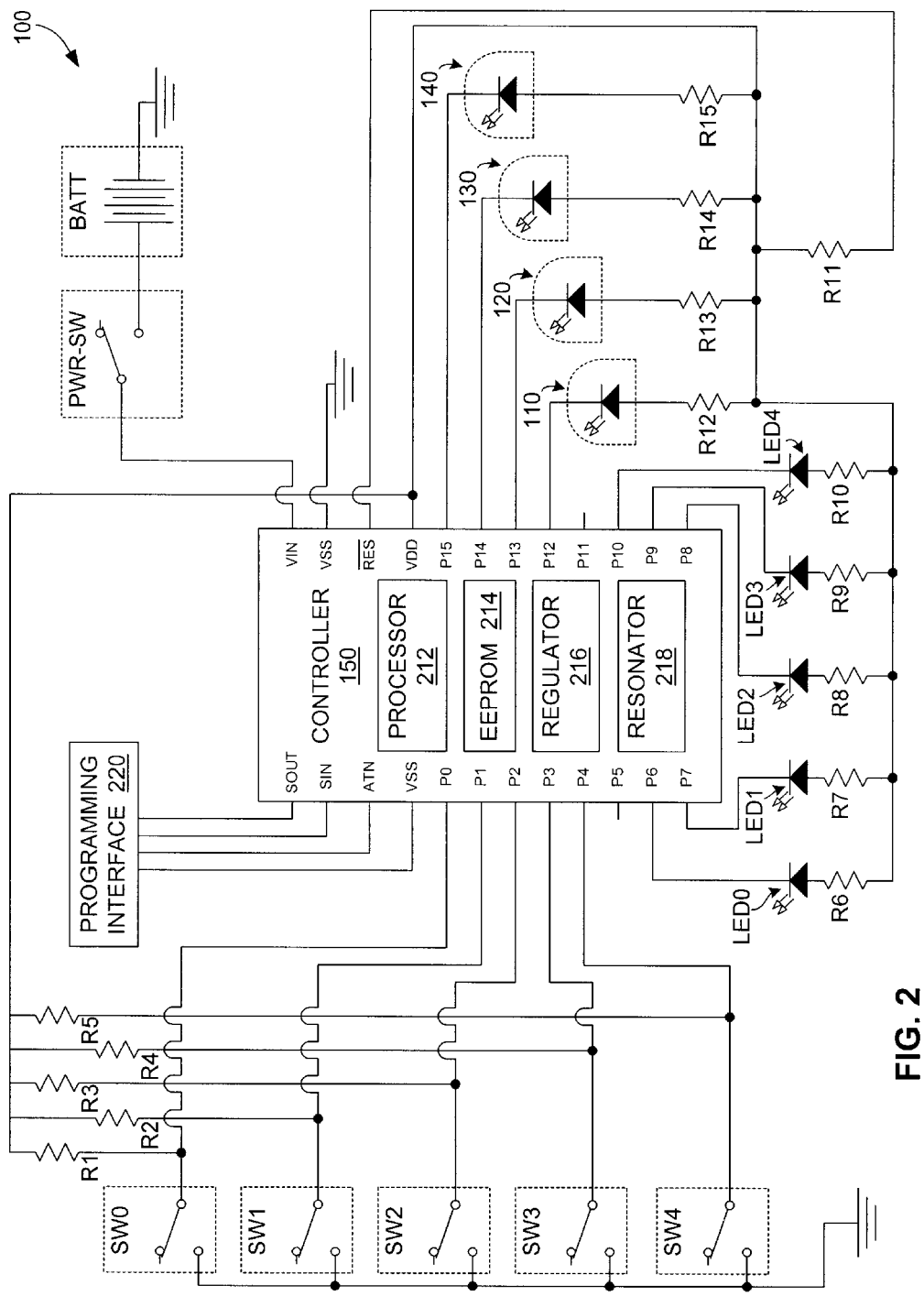
FIG. 2 is a simplified circuit diagram of the portable speech therapy device of FIG. 1.

FIG. 2 is a simplified circuit schematic showing speech therapy device 100 in additional detail. In one embodiment, controller 150 is a Stamp II™ computer available from Parallax Inc. of Rocklin, Calif. The Stamp II includes a processor (PBASIC interpreter) 212, a serial EEPROM 214, a 5-volt regulator 216, and a resonator 218. In addition to serial programming (i.e., SOUT, SIN, and ATN), power (VIN), ground (VSS), and reset (RST-bar) terminals, the Stamp II provides sixteen programmable I/O terminals P0–P15. In general, the programmable I/O terminals P0–P15 of the Stamp II are programmed via a programming interface port 220, which is also used to store instruction sets (data) associated with the various sequences in EEPROM 214. During operation, in response to external stimulus (e.g., actuation of switch SW0) processor 212 reads the associated instruction set from EEPROM 214, and executes the associated sequence as described below. The programming and operation of the Stamp II are described in additional detail in documents available from Parallax Inc.

Referring again to FIG. 2, actuation switches SW0–SW4 are connected to programmable I/O terminals P0–P4 of controller 150, respectively, and are also connected to +5 Volts (terminal VDD) through pullup resistors R1–R5 (e.g., 10 kΩ), respectively. Similarly, status indicators LED0–LED4 are respectively connected to programmable I/O terminals P6–P10 of controller 150, respectively. Status indicators LED0–LED4 are also connected to the VDD terminal of controller 150 through resistors R6–R10 (e.g., 470 Ω), respectively, and also to the reset (RES-bar) terminal through resistor R11 (e.g., 1 kΩ) as shown. Light-emitting indicators 110–140, respectively, which are connected to programmable I/O terminals P12–P15 of controller 150, respectively, and are also coupled to the VDD terminal of controller 150 through resistors R12–R15 (e.g., 220 Ω), respectively. Light-emitting indicators 110–140 are also coupled to the reset (RES-bar) terminal through resistor R11 (e.g., 1 kΩ) as shown.

Figure 3:
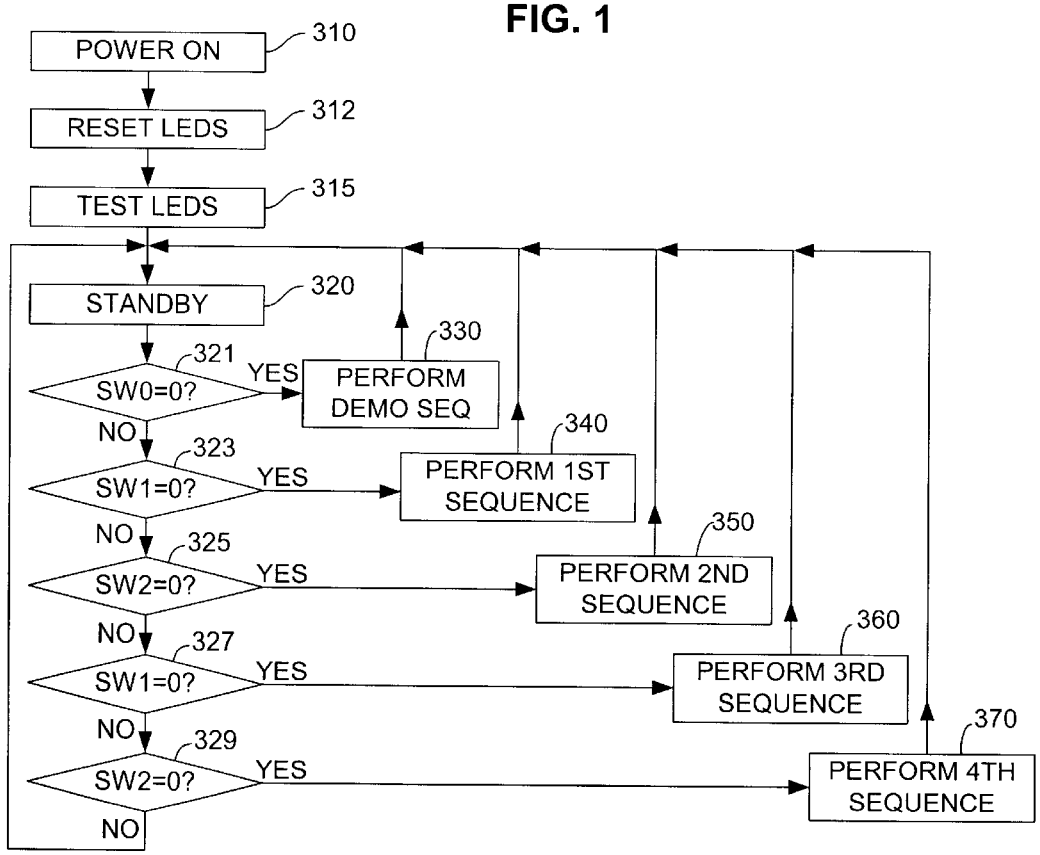
FIG. 3 is a flow diagram showing the operation of the portable speech therapy device in accordance with one embodiment.

FIG. 3 is a simplified flow diagram showing the operation of controller 150. Upon power-up (block 310), controller 150 resets light-emitting indicators 110–140 and status indicators LED0–LED4 (block 312), then executes an optional test operation during which the various LEDs are turned on and off in sequence (block 315). Upon completing this test operation, controller 150 enters a standby mode (block 320) and awaits input. During standby, LED 110 is illuminated as a standby indicator. Subsequent input from a patient (user) initiates an associated sequence. For example, when actuation switch SW0 is depressed (321), the demonstration sequence is executed. Similarly, the actuation of switch SW1 (323) initiates the execution of a first sequence (block 340), the actuation of switch SW2 (325) initiates the execution of a second sequence (block 350), the actuation of switch SW3 (327) initiates the execution of a third sequence (block 360), and the actuation of switch SW4 (329) initiates the execution of a third sequence (block 370). Upon completion of each sequence, controller 150 returns to the standby mode (block 320).

In accordance with an aspect of the present invention, each sequence of control signals generated by controller 150 presents a progressively greater challenge to the patient/user, thereby reducing recovery time by allowing the patient to progress at his/her own pace from relatively easy exercises to relatively hard exercises without the supervision of an SPL. This progressively greater challenge is provided by decreasing the response time from sequence to sequence, increasing the total number of prompts (i.e. the total number of times the colored indicators 110–140 are turned on) per sequence, and changing order in which the colored indicators 110–140 are turned on in each sequence.

FIGS. 4(A) through 4(C) are flow diagrams showing examples of sequences in which the light-emitting indicators 110–140 are turned on for progressively decreasing time periods from sequence to sequence. FIG. 4(A) shows a typical demonstration sequence 330 initiated by pressing actuation switch SW0 (see FIG. 3, block 221, YES branch). Demonstration sequence 330 begins by resetting all LEDs and turning on status indicator LED0. Subsequently, each light-emitting indicator 110–140 is turned on in sequence for a period of 3 seconds (blocks 411, 421, 431, and 441), with a pause of one second between each prompt (blocks 412, 422, 432, and 442). At the end of the demonstration sequence, LED0 is turned off. The demonstration sequence is used, for example, during an initial session in which an SPL introduces device 100 to the patient and teaches the patient the four sounds associated with each indicator 110–140. When the patient has mastered the demonstration sequence, the patient is able to operate device 100 outside of the SPL's presence (e.g., at home) to master each of the progressively more difficult sequences. For example, after mastering the demonstration sequence, the patient presses actuation switch SW1, which initiates a (first) sequence 340 during which light-emitting indicators 110–140 are turned on and off in a predetermined or random pattern for a period of two seconds (blocks 413, 423 . . . 443), again with a pause of one second between each prompt (blocks 414, 424 . . . 444). Upon mastering sequence 340, the patient may move on to the next (second) sequence 350 shown in FIG. 4(C), which is initiated by pressing actuation switch SW1, and during which light-emitting indicators 110–140 are turned on and off in a predetermined or random pattern for a period of one second (blocks 415, 425 . . . 445), again with a pause of one second between each prompt (blocks 416, 426 . . . 446). By progressively reducing the response time, a patient is presented a progressively greater challenge to form the sounds quickly that can reduce recovery time.

Figure 5A:
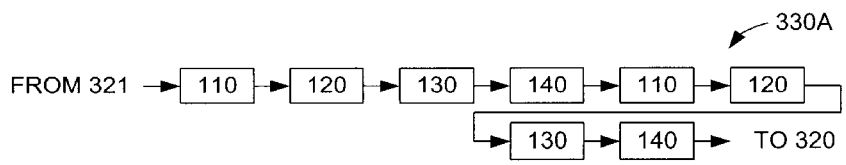
FIGS. 5(A), 5(B), 5(C), and 5(D) are simplified flow diagrams showing alternative indicator light sequences produced by the portable speech therapy device.
Figure 5B:
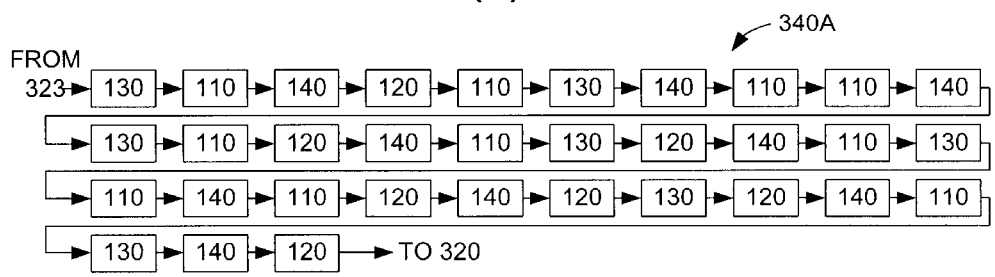
Figure 5C:
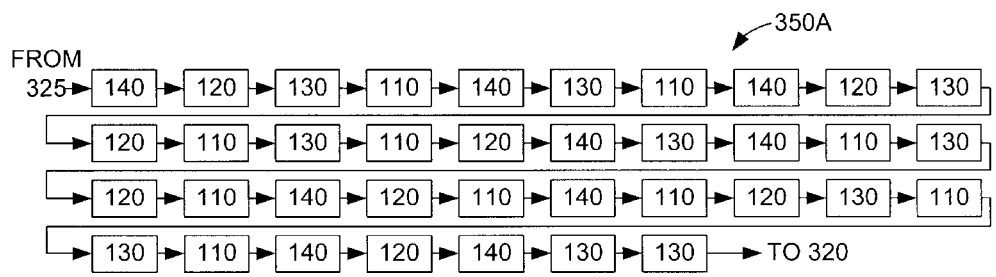
Figure 5D:
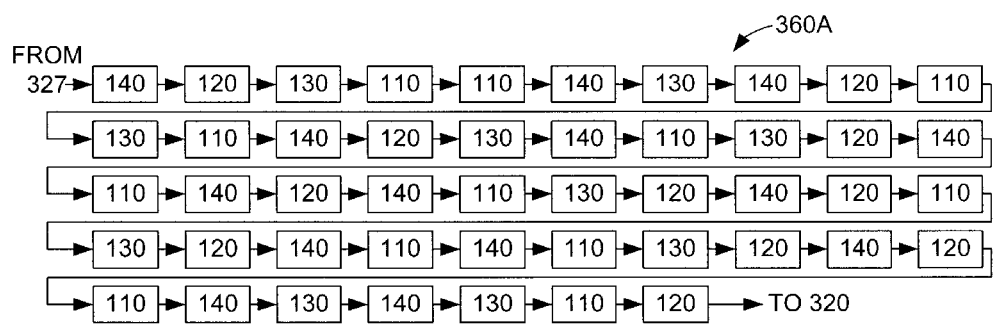

FIGS. 5(A) through 5(D) are simplified flow diagrams showing examples of alternative sequences in which the light-emitting indicators 110–140 are turned on in progressively increasing numbers from sequence to sequence. FIG. 5(A) shows an alternative demonstration sequence 330A during which the basic pattern 110–120–130–140 is repeated twice for a total sequence of eight prompts. Upon mastering demonstration sequence 330A, the patient is increasingly challenged by sequence 340A (FIG. 5(B); 33 prompts), sequence 350A (FIG. 5(C); 37 prompts), and sequence 360A (FIG. 5(D); 44 prompts). By progressively increasing the total number of prompts, a patient is presented a progressively greater endurance challenge that can reduce recovery time. Further challenge is presented by changing the pattern of indicators, as shown in FIGS. 5(B), 5(C), and 5(D). Yet further challenge is presented by combining reduced response time, increased number of total prompts, and changing (or random) patterns in the progressively more difficult sequences. This allows the patient to exercise, practice, and reinforce training learned in therapy at home without the direct supervision of an SLP, thereby potentially drastically reducing recovery time, and enabling the patient to resume improved speech much quicker than by conventional, SLP-supervised methods. Note that the programmability of device 100 allows an SPL to repeatedly change the stored sequences to correspond with a particular patient's recovery progress.

Although the present invention has been described with respect to certain specific embodiments, it will be clear to those skilled in the art that the inventive features of the present invention are applicable to other embodiments as well. For example, the colors associated with light-emitting indicators 110–140 may be changed, or replaced with indicia or other symbols identifying the four sounds. Further, device 100 may be modified to include more than four light-emitting indicators. Moreover, non-visual prompts may be utilized in addition to or in place of the light-emitting indicators (such as recorded sounds). Further, as suggested above, a random number generator may be implemented to generate random sequences. All such modified embodiments are intended to fall within the scope of the present invention.

What is claimed is:

1. A portable speech therapy device for visually prompting predetermined voice exercises from a patient, the device comprising:

a lightweight portable housing having an upper wall;

a plurality of light-emitting indicators mounted on the upper wall of the housing;

first and second switches mounted on a side edge of the upper wall of the housing; and a controller mounted in the housing for activating the plurality of light-emitting indicators in a first sequence of a predetermined pattern in response to manual actuation of the first switch, and for activating the plurality of light-emitting indicators in a second sequence of a predetermined pattern in response to manual actuation of the second switch; wherein the first and second sequences of the predetermined pattern prompt the patient to perform predetermined voice exercises in response to the plurality of activated light-emitting indicators without the direct supervision of a specialist.

2. The portable speech therapy device according to claim 1, wherein a first light-emitting indicator of the plurality of light-emitting indicators comprises a red light-emitting diode (LED), a second light-emitting indicator of the plurality of light-emitting indicators comprises a white LED, a third light-emitting indicator of the plurality of light-emitting indicators comprises a yellow LED, a fourth light-emitting indicator of the plurality of light-emitting indicators comprises a green LED.

3. The portable speech therapy device according to claim 1, wherein each of the light-emitting indicator comprises a light-emitting diode generating at least 7,000 millicandles of light.

4. The portable speech therapy device according to claim 1, wherein the plurality of light-emitting indicators are arranged along a top edge of the upper wall of the housing.

5. The portable speech therapy device according to claim 1, wherein each of the light-emitting indicators includes a colored bulb and a light source.

6. The portable speech therapy device according to claim 5, wherein the first and second switches comprises pushbutton switches arranged along a side edge of the upper wall of the housing.

7. The portable speech therapy device according to claim 6, further comprising first and second status indicators respectively located adjacent to the first and second switches, wherein the first status indicator is turned on by the controller during the first sequence, and the second status indicator is turned on by the controller during the second sequence.

8. The portable speech therapy device according to claim 7, wherein the first and second status indicators comprise red light-emitting diodes (LEDs).

9. The portable speech therapy device according to claim 1, wherein the controller comprises means for turning the plurality of light-emitting indicators on for a first time period during the first sequence of the predetermined pattern, and for turning the plurality of light-emitting indicators on a second time period during the second sequence of the predetermined pattern, wherein the second time period is longer than the first time period.

10. The portable speech therapy device according to claim 1, wherein the controller comprises means for turning on and off a first number of said plurality of light-emitting indicators during the first sequence of the predetermined pattern, and for turning on and off a second number of said plurality of light-emitting indicators during the first sequence of the predetermined pattern, wherein the second number of said plurality of light-emitting indicators is greater than the first number of said plurality of light-emitting indicators.

11. The portable speech therapy device according to claim 1, wherein the controller comprises means for turning on and off the plurality of light-emitting indicators in for a first pattern during the first sequence of the predetermined pattern, and for turning on and off the plurality of light-emitting indicators on a second pattern during the second sequence of the predetermined pattern.

12. The portable speech therapy device according to claim 1, wherein the controller comprises a memory device for storing a first instruction data associated with the first sequence of the predetermined pattern and a second instruction data associated with the second sequence of the predetermined pattern, and a processor for reading the first instruction data and generating first control signals during the first sequence of the predetermined pattern, and for reading the second instruction data and generating second control signals during the second sequence of the predetermined pattern.

13. The portable speech therapy device according to claim 12, wherein the memory device is an EEPROM.

14. The portable speech therapy device according to claim 13, further comprising a programming interface port connected to the controller for transmitting the first instruction data and the second instruction data to the EEPROM.

15. The portable speech therapy device according to claim 1, further comprising a battery stored in the housing, and a power switch mounted on a side wall of the housing.

16. A portable speech therapy device for visually prompting predetermined voice exercises from a patient, the device comprising:
   a plurality of switches mounted on a lightweight portable housing;
   a controller mounted in the lightweight portable housing for generating a plurality of control signals in a plurality of sequences of a predetermined pattern in response to manual actuation of the plurality of switches, such that each of the plurality of sequences of the predetermined pattern is performed in response to the actuation of an associated switch of the plurality of switches; and
   means, mounted on the lightweight portable housing, for prompting a patient to perform predetermined voice exercises in response to the plurality of control signals generated by the controller without the direct supervision of a specialist.

17. The portable speech therapy device according to claim 16, wherein the means for prompting comprises a plurality of light-emitting indicators, wherein each light-emitting indicator has a unique color.

18. The portable speech therapy device according to claim 16, wherein each of the plurality of switches comprises a pushbutton switch.

19. The portable speech therapy device according to claim 16, wherein the controller comprises a memory device for storing a plurality of instruction data sets respectively associated with the plurality of sequences of the predetermined pattern, and a processor for reading a selected instruction data set from the memory device and generating said control signals in response to the manual actuation of the associated switches.

* * * * *

UNITED STATES PATENT AND TRADEMARK OFFICE
CERTIFICATE OF CORRECTION

PATENT NO. : 6,623,273 B2
DATED : September 23, 2003
INVENTOR(S) : Fred C. Evangelisti It is certified that error appears in the above-identified patent and that said Letters Patent is hereby corrected as shown below:

Column 1,
Lines 30, 38, 40, 42, 57 and 66, replace "SPL" with -- SLP --.
Lines 37-38, replace "physically present" with -- physical presence --.
Line 61, replace "SPL's" with -- SLP's --.

Column 2,
Line 34, replace "A" with -- a --.

Column 3,
Lines 3 and 5, replace "SPL" with -- SLP --.
Line 43, replace "producting" with -- producing --.
Line 45, replace "bulb" with -- bulbs --.

Column 4,
Line 62, replace "SPL" with -- SLP --.

Column 5,
Lines 15 and 61, replace "SPL" with -- SLP --.
Line 19, replace "SPL's" with -- SLP's --.

Column 6,
Line 42, replace "indicator" with -- indicators --.
Line 52, replace "comprises" with -- comprise --.

Column 7,
Line 17, delete "for".
Line 20, replace "on" with -- in --.

Signed and Sealed this

Fifth Day of July, 2005

JON W. DUDAS
*Director of the United States Patent and Trademark Office*